United States Patent
Kawagoe et al.

(10) Patent No.: US 7,910,153 B2
(45) Date of Patent: Mar. 22, 2011

(54) LASER DEPOSITION ACCEPTANCE JUDGMENT METHOD AND APPARATUS FOR THE METHOD

(75) Inventors: Tadashi Kawagoe, Obu (JP); Yasunori Kawamoto, Toyota (JP)

(73) Assignee: Denso Corporation, Kariya (JP)

( * ) Notice: Subject to any disclaimer, the term of this patent is extended or adjusted under 35 U.S.C. 154(b) by 1302 days.

(21) Appl. No.: 11/435,782

(22) Filed: May 18, 2006

(65) Prior Publication Data

US 2006/0278113 A1    Dec. 14, 2006

(30) Foreign Application Priority Data

Jun. 10, 2005   (JP) .................................. 2005-171359

(51) Int. Cl.
  *B05D 3/06*   (2006.01)
  *C08J 5/12*   (2006.01)
  *G01B 15/00*  (2006.01)
  *B29C 65/16*  (2006.01)
  *B29C 65/82*  (2006.01)

(52) U.S. Cl. .............. 427/8; 427/554; 427/559; 156/64; 156/272.8; 219/121.66; 219/121.83; 264/406

(58) Field of Classification Search ........................ None
See application file for complete search history.

(56) References Cited

U.S. PATENT DOCUMENTS

| | | | |
|---|---|---|---|
| 3,986,391 A | | 10/1976 | Vahaviolos |
| 5,142,151 A | * | 8/1992 | Varnell et al. ............. 250/339.08 |
| 5,154,861 A | * | 10/1992 | McBrierty et al. ........... 264/1.38 |
| 5,155,329 A | | 10/1992 | Terada et al. |
| 6,624,417 B1 | * | 9/2003 | Inada et al. .............. 250/339.12 |
| 6,770,158 B2 | * | 8/2004 | Hartley et al. .................. 156/64 |
| 7,343,218 B2 | * | 3/2008 | Caldwell et al. ............. 700/166 |
| 2002/0134817 A1 | | 9/2002 | Shepard |
| 2003/0150543 A1 | * | 8/2003 | Hartley et al. .................. 156/64 |
| 2005/0119377 A1 | | 6/2005 | Ishii et al. |
| 2007/0084552 A1 | * | 4/2007 | Watanabe et al. .......... 156/272.8 |
| 2007/0096352 A1 | * | 5/2007 | Cochran et al. .............. 264/40.6 |
| 2010/0140233 A1 | * | 6/2010 | Matsumoto et al. ..... 219/121.64 |

(Continued)

FOREIGN PATENT DOCUMENTS

JP    A-10-058544    3/1998

(Continued)

OTHER PUBLICATIONS

Mexican Patent Office Communication regarding Mexican Patent Application No. PA/a/2006/006353, with translation of most Doc., date? Oct. 2009?

(Continued)

*Primary Examiner* — Marianne L Padgett
(74) *Attorney, Agent, or Firm* — Oliff & Berridge, PLC

(57) ABSTRACT

Acceptance/rejection of a deposition condition is judged by detecting an exothermic quantity of a deposition portion 3 by using an infrared beam sensor 2 during laser deposition of a resin material 4 having transmissibility to a laser beam and a resin material 5 having absorptivity to the laser beam L. The exothermic condition of the deposition portion is detected by using an infrared beam sensor matching with a wavelength of an infrared beam having a high transmission factor from infrared beam transmission characteristics of the transmissible resin to judge whether or not suitable energy is applied to the deposition portion and whether or not the deposition portion is formed. The exothermic quantity of the transmissible resin is detected by an infrared beam sensor 2A to judge acceptance or rejection of the deposition portion even when the applied energy changes.

1 Claim, 7 Drawing Sheets

FOREIGN PATENT DOCUMENTS

| | | |
|---|---|---|
| JP | A-10-249941 | 9/1998 |
| JP | A-2004-122560 | 4/2004 |
| JP | A-2004-168033 | 6/2004 |
| JP | A-2004-361229 | 12/2004 |

OTHER PUBLICATIONS

Translation of Nov. 10, 2009 Office Action issued in Japanese Patent Application No. 2005-171359.

* cited by examiner

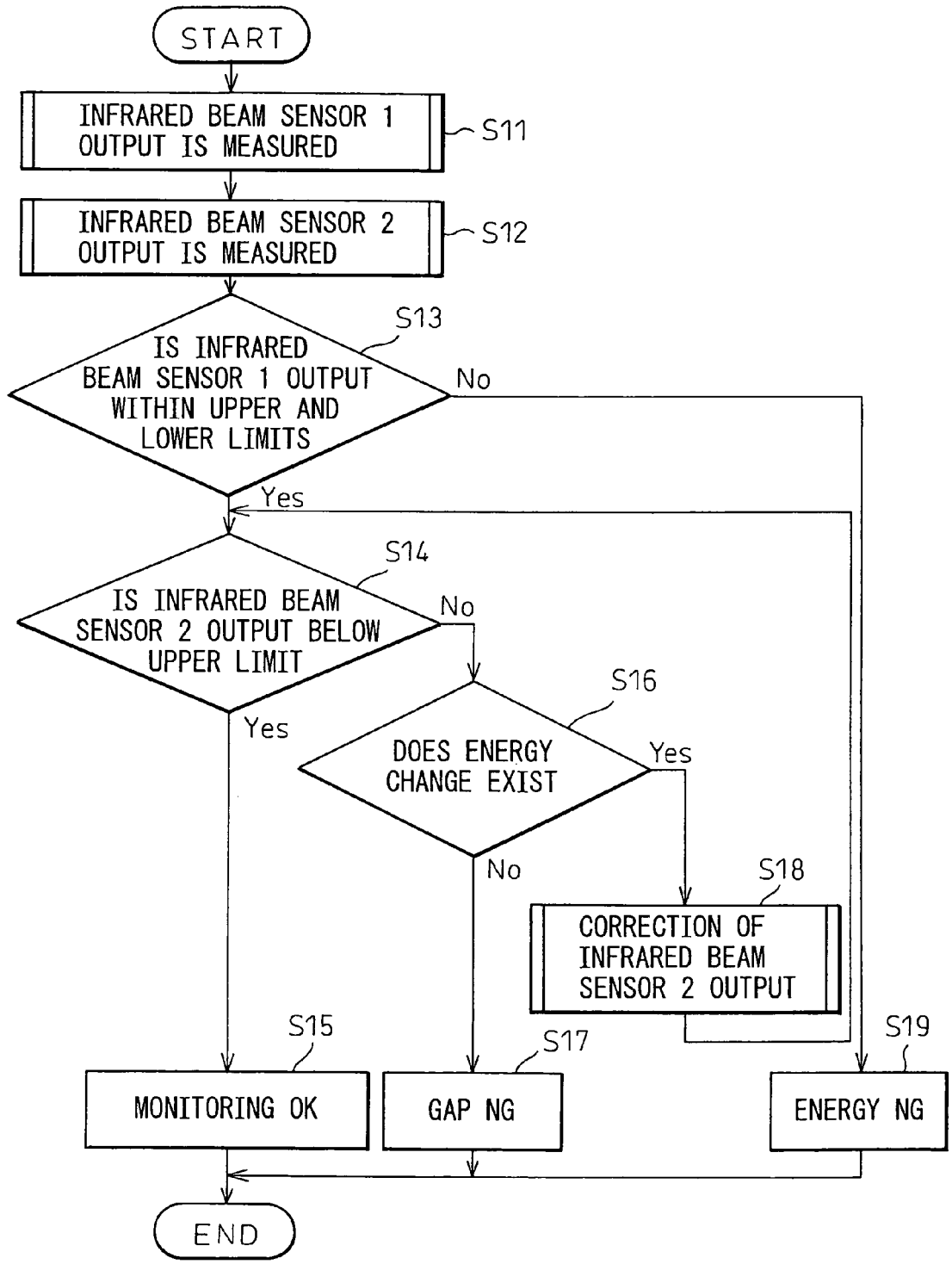

LASER DEPOSITION ACCEPTANCE JUDGMENT METHOD AND APPARATUS FOR THE METHOD

BACKGROUND OF THE INVENTION

1. Field of the Invention

This invention relates to a laser deposition (welding) acceptance judgment method for judging acceptance or rejection of a deposition (weld) portion welded by laser deposition (welding) and an apparatus for the method.

2. Description of the Related Art

To reduce the weight and the cost, a resin molding has been used in recent years as a component of automobiles by, for example, forming the component from a resin. To improve productivity, such a resin molding is split molded in advance and the resulting split moldings are mutually welded to give a resin molding.

To bond the resin materials to one another in this case, bonding by using an adhesive has been done but bonding is likely to fail due to influences of heat. Therefore, a method that heats and melts the resin materials by using a laser beam has been employed recently.

Deposition (welding) of the resin materials by the laser beam is carried out by the steps of superposing a resin material having transmissibility to the laser beam and a resin material having absorptivity to the laser beam, irradiating the laser beam from the side of the transmissible resin material, heating and fusing the absorptive resin material by the laser energy, fusing also the transmissible resin material by the heat and integrally bonding the contact surfaces of both transmissible resin material and absorptive resin material.

Judgment of the deposition condition of laser deposition of the resin materials has been conducted by an inspection by eye with workers manually sampling the products, but involves an extended time and a large cost for the quality judgment. Therefore, the following two methods have been employed for judging whether or not a suitable deposition is achieved.

(1) A method that irradiates a laser beam after deposition and detects the existence or absence of a deposition portion between a resin material on the transmission side and a resin material on the absorption side (refer to Japanese Unexamined Patent Publication No. 2004-361229, for example).

(2) A method that detects the temperature of the deposition portion by a temperature sensor during laser deposition or a method that detects a temperature difference of a portion near the deposition portion before and after deposition, and judges acceptance or rejection on the basis of the temperature difference (refer to Japanese Unexamined Patent Publication No. 10-249941, for example).

According to the method (1), however, the laser beam must be irradiated from an oblique direction to the deposition portion. Therefore, detection of the deposition portion of a resin product having ribs is not possible. Furthermore, the inspection cannot be made during laser deposition as a production step but must be conducted after completion of laser deposition, thereby inviting the problem that productivity drops because an additional inspection step is added.

Because the method (2) uses the temperature sensor, the sensor must be calibrated in accordance with the condition of the resin as the radiation factor changes with heating and melting of the resin material. Even when calibration is done, whether or not a gap occurs between the resin materials cannot be detected when such a gap occurs because the surface temperature is the same. To detect a temperature of a portion near the deposition portion, it is extremely difficult for the temperature sensor to correctly follow the orbit of three-dimensional deposition because a robot for laser deposition moves three-dimensionally.

SUMMARY OF THE INVENTION

In view of the problems described above, it is an object of the present invention to provide a laser deposition acceptance judgment method capable of detecting defects in deposition strength between resin materials and non-deposition due to a gap between the resin materials, and an apparatus for the method.

A laser deposition acceptance judgment method according to one aspect of the invention judges acceptance/rejection of a deposition portion 3 by detecting an exothermic quantity of the deposition portion 3 by using an infrared beam sensor 2 during laser deposition of a resin material 4 having transmissibility to a laser beam L and a resin material 5 having absorptivity to the laser beam L, and can thus monitor a deposition defect resulting from an excess or an insufficiency of energy and a deposition defect resulting from a gap between both resin materials 4 and 5 when energy is constant.

In the judgment method described above, the deposition portion is judged as acceptable when an output of the infrared beam sensor 2 is within an upper and lower limit range. In this way, it becomes possible to exclude the deposition defect resulting from a wide gap between both resin materials and a deposition defect resulting from an energy insufficiency.

The judgment method described above further includes another detection means for detecting an exothermic quantity of the transmissible resin material 4. It becomes thus possible to monitor whether or not any change occurs in applied energy during deposition, whether or not a gap exists between both resin materials and whether or not the change of applied energy and the gap exist.

In the judgment method described above, the deposition portion 3 is judged as acceptable when the output of the infrared beam sensor 2A falls within the upper and lower limits and the output of another infrared beam sensor is below the upper limit. It is thus possible to secure the quality of the deposition portion.

In the judgment method described above, acceptance or rejection of the deposition portion is judged by judging the existence or absence of an energy change when the output of the infrared beam sensor is not below the upper limit standard, and by judging whether or not a corrected output obtained by correcting the output of the infrared beam sensor 3 by an energy change component is below the upper limit. It is thus possible to correctly judge acceptance or rejection of the deposition portion 3 even when a change exists in the input energy.

According to another aspect of the present invention, there is provided a laser deposition acceptance judgment apparatus that is an apparatus invention whereas the invention of the foregoing embodiment is a method invention. The function and effect of this invention is the same as that of the invention of the foregoing embodiment.

Similarly, the laser deposition acceptance judgment apparatus is an apparatus invention whereas the invention of the foregoing embodiment is a method invention. The function and effect of this invention is the same as that of the invention of the foregoing embodiment.

In the laser deposition acceptance judgment apparatus of the invention, the first infrared beam sensor 2A is selected from those which match with a wavelength λmin at which transmission factor characteristics of the infrared beam become minimal and the second infrared beam sensor 2B is selected from those which match with a wavelength λmax at which the transmission factor characteristics of the infrared beam become maximal. It becomes thus possible to improve the measurement accuracy.

The present invention may be more fully understood from the description of preferred embodiments of the invention, as set forth below, together with the accompanying drawings.

BRIEF DESCRIPTION OF THE DRAWINGS

In the drawings:

FIG. 12 is a flowchart showing the procedure of a deposition acceptance judgment in a laser deposition acceptance judgment apparatus according to the second embodiment.

DESCRIPTION OF THE PREFERRED EMBODIMENTS

Figure 1:
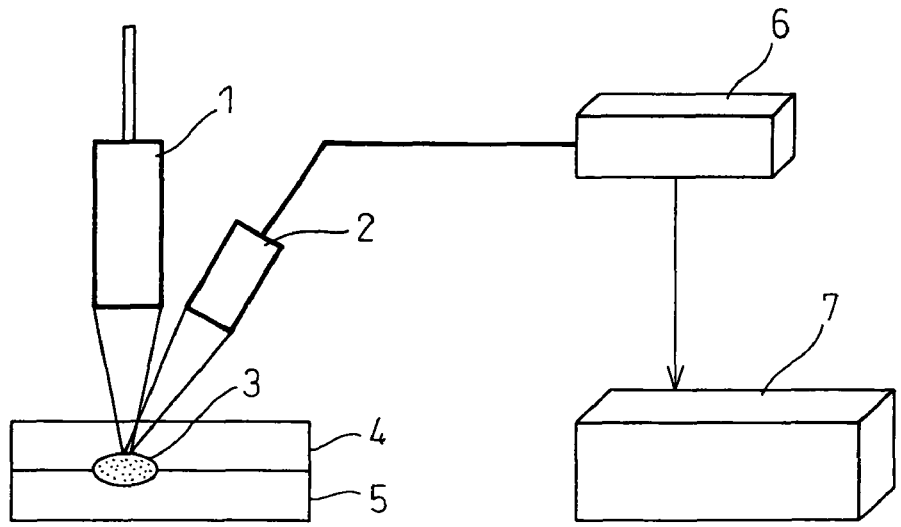
FIG. 1 is an explanatory view for explaining a construction of a laser deposition acceptance judgment apparatus according to a first embodiment of the invention.

A laser deposition acceptance judgment method and its apparatus according to preferred embodiments of the invention will be hereinafter explained with reference to the accompanying drawings. FIG. 1 is a view for explaining a construction of the laser deposition acceptance judgment apparatus according to the first embodiment of the invention. In the drawing, reference numeral 4 denotes a transmissible resin material having a high transmission factor to a laser beam. Reference numeral 5 denotes an absorptive resin material having a high absorption factor to the laser beam. These resin materials 4 and 5 are superposed with one another so that the transmissible resin material 4 is positioned on the laser irradiation side. The resin materials 4 and 5 superposed in this way are pressed and set by a support jig (not shown) and are held on a table (not shown). Generally, this table can move in both X- and Y-axes directions and can rotate on an X-Y plane.

Reference numeral 1 denotes a laser head for irradiating a laser beam L. The laser beam L generated by a laser generator, not shown, and passing through an optical fiber is irradiated to the bond portion of both resin materials 4 and 5. The laser head 1 is generally held by a robot, not shown in the drawing, and an irradiation angle and an irradiation position of the laser beam L can be varied. The laser head 1 can be moved in some cases in the X- and Y-axes directions. Therefore, scanning of the laser beam L can be done by moving the laser head 1 or by moving the table holding both resin materials 4 and 5.

This embodiment employs an infrared beam sensor 2 for detecting an exothermic quantity of the deposition portion between the transmissible resin material 4 and the absorptive resin material 5. The infrared beam sensor 2 is connected to a sensor amplifier 6. The exothermic quantity detected by the infrared beam sensor 2 is converted to an electrical signal and outputted, and the sensor amplifier 6 amplifies this signal. The sensor amplifier 6 is connected to a judgment device 7. The output signal amplified is inputted to the judgment device 7, where acceptance/rejection of the deposition portion 3 is judged in accordance with the procedure that will be later described.

Figure 2:
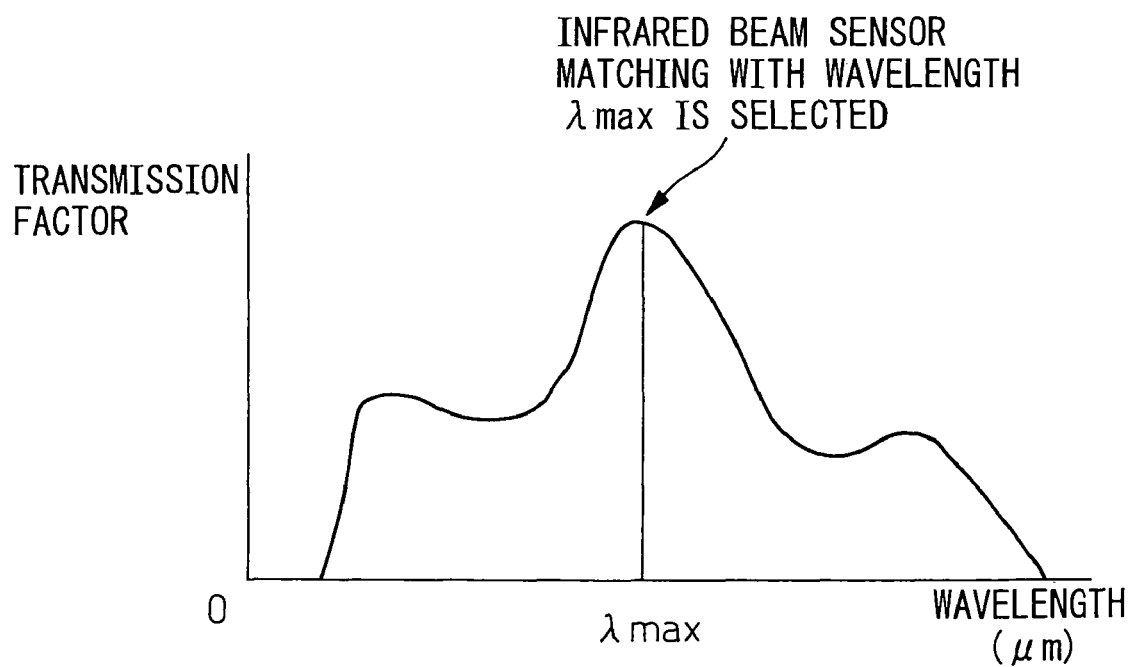
FIG. 2 is a graph showing transmission factor characteristics of a transmissible resin to an infrared beam.

FIG. 2 is a graph showing a transmission factor of the transmissible resin to the infrared beam. The abscissa represents a wavelength and the ordinate represents the transmission factor. This embodiment preferably uses an infrared beam sensor 2 matching with a wavelength λmax (μm) of the infrared beam at which the transmission factor becomes maximal. In other words, a sensor suitable for measuring the wavelength λ of 8 to 14 μm of the infrared beam, such as a thermopile, is selected as the infrared beam sensor 2. The fitting angle of the infrared beam sensor 2 is preferably situated immediately above the measurement spot. In this embodiment, however, because the laser head 1 is arranged immediately above the deposition portion 3, the infrared beam sensor 2 is fitted at an angle of ±30 degrees from a position immediately above the measurement spot. The infrared beam sensor 2 is arranged at a position such that, when the width of the deposition portion 3 is 2 mm, the measurement spot becomes 2 mm. To measure the exothermic quantity of the transmissible resin material 4, measurement is made in such a fashion that the measurement spot exists on the surface of the transmissible resin material 4.

Figure 3:
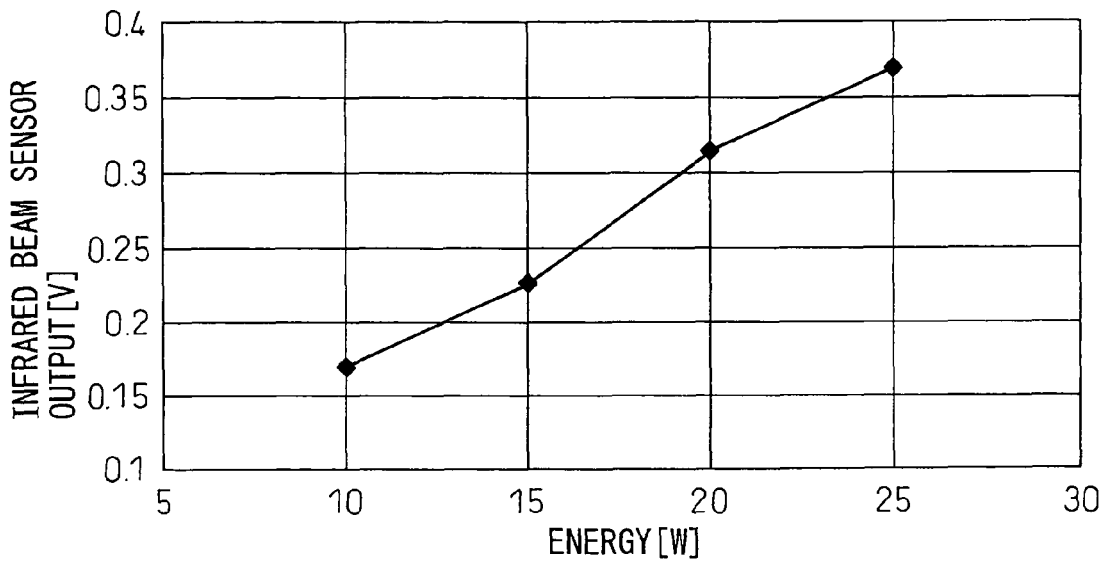
FIG. 3 is a graph showing the relation between applied energy and an infrared sensor output.

FIG. 3 is a graph showing the relation between applied energy (W) and the infrared beam sensor output (V). It can be understood from this graph that the output (V) of the infrared beam sensor 2 increases with the increase of applied energy (W) of the laser beam L irradiated from the laser head 1. In other words, the greater the applied energy, the greater become the deposition portion 3 and the exothermic quantity.

Figure 4:
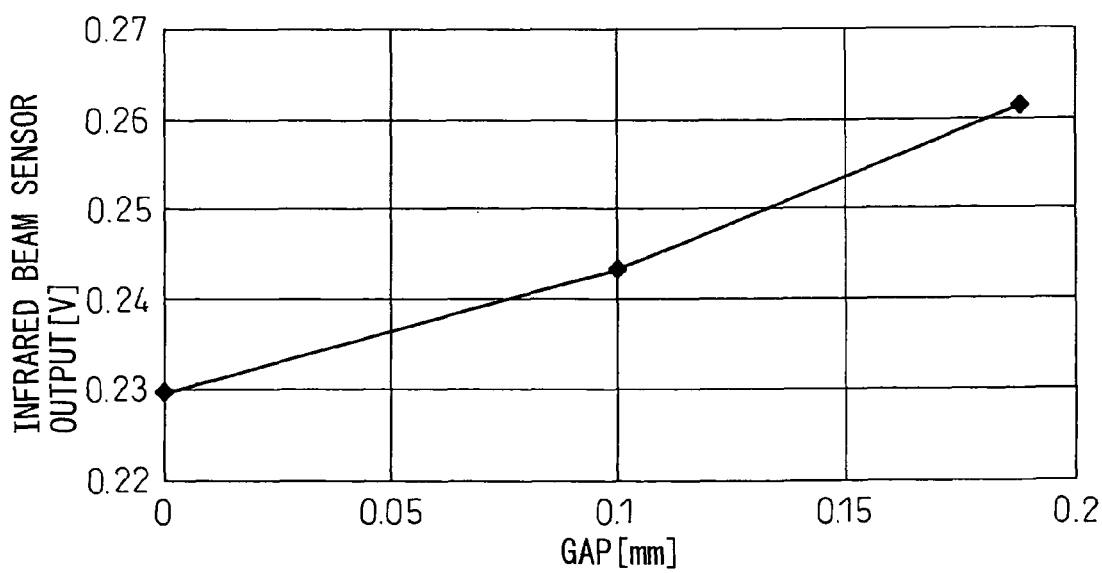
FIG. 4 is a graph showing the relation between a gap of both resin materials and the infrared beam sensor output.

FIG. 4 is a graph showing the relation between the gap (mm) of both resin materials 4 and 5 and the output (V) of the infrared beam sensor 2. It can be understood from this graph that the output (V) of the infrared beam sensor 2 increases when the gap (mm) becomes greater. It can be appreciated that when the gap (mm) becomes great, applied energy is non-uniformly applied to the absorptive resin material 5 as one of the resin materials, and heat is not transmitted to the transmissible resin material 4 with the result that the exothermic quantity of the deposition portion 3 increases and the output of the infrared beam sensor 2 becomes greater.

The exothermic quantity at the deposition portion 3 of the resin materials 4 and 5 varies in accordance with the change of applied energy during laser deposition as described above. When the gap develops between both resin materials 4 and 5, laser energy is fully applied to the absorptive resin material 5, so that exothermy of the deposition portion 3 becomes excessive. Therefore, the exothermic condition of the deposition portion 3 is detected by using the infrared beam sensor 2 matching with the wavelength λ of the infrared beam having the excellent transmission factor as shown in FIG. 2 and whether or not the deposition portion 3 is formed by the application of suitable of energy to the deposition portion 3 and whether or not the non-deposited portion occurs is judged by the occurrence of the gap between both resin materials 4 and 5.

In other words, when no gap exists between the transmissible resin material 4 and the absorptive resin material 5, the deposition portion 3 becomes small in size and the exothermic quantity becomes small, too, when the energy applied by the laser beam L is small. On the contrary, when the energy is large, the deposition portion 3 becomes large and the exothermic quantity becomes large, too. Consequently, it is possible to judge as insufficiency of energy when the output of the infrared beam sensor 2 is small and great though the applied energy is constant. When the gap exists, the output of the infrared beam sensor 2 becomes great though the applied energy is constant. This case can be judged as a deposition defect owing to the gap.

Figure 5:
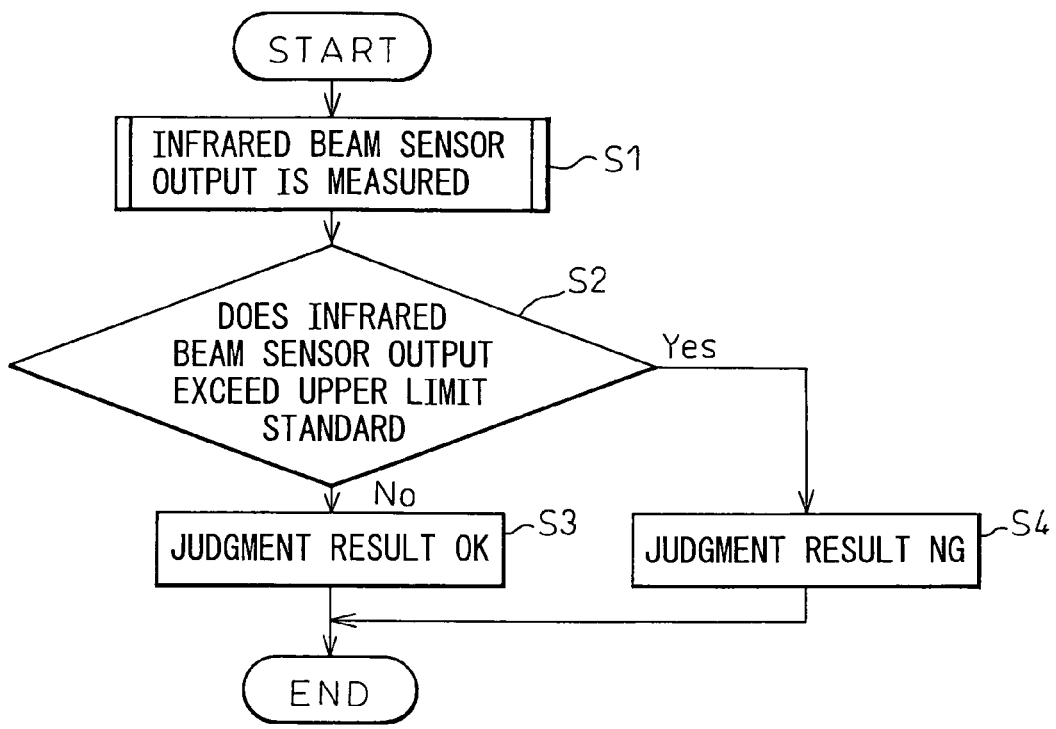
FIG. 5 is a flowchart showing a procedure of deposition acceptance judgment in the laser deposition acceptance judgment apparatus according to the first embodiment.

FIG. 5 is a flowchart for judging acceptance/rejection of the deposition portion 3 by using the judgment device 7 according to the first embodiment. First, the result of the output measurement of the infrared beam sensor 2 is inputted to the judgment device 7 in Step S1. Whether or not the output of the infrared beam sensor 2 measured exceeds an upper limit standard as a predetermined value is judged in Step S2. When the output does not exceed the upper limit standard (in the case of NO), the flow proceeds to Step S3, where the deposition portion 3 is judged as acceptable and the flowchart is completed. When the output exceeds the upper limit standard (in the case of YES), the flow proceeds to Step S4, whether the deposition portion 3 is judged as unacceptable and the flowchart is completed. Acceptance/rejection of the deposition condition of the deposition portion 3 is conducted in this way.

In this embodiment, the kind of the absorptive resin material 5 having a high absorption factor for the laser beam L is not particularly limited as long as it has thermo-plasticity and can absorb the laser beam L without transmitting it. For example, it is possible to use a mixture of polyamide (PA), polyethylene (PE), polypropylene (PP), polycarbonate (PC), polyoxymethylene (POM), actylonitrile-butadiene-styrene (ABS), polybutylene terephthalate (PBT), polyphenylene sulfide (PPS), acryl (PMME), etc, with predetermined colorants such as carbon black, dyes and pigments.

The kind of the transmissible resin material 4 having a high transmission factor for the laser beam L is not particularly limited as long as it has thermo-plasticity and a predetermined transmission factor for the laser beam L. Basically, the resins listed above can be employed. Colorants may be mixed as long as a predetermined transmission factor can be secured. Incidentally, it is necessary in this embodiment to select those materials which have a high transmission factor for the laser beam L and high transmission performance for the infrared beam in the infrared beam sensor 2 as the transmissible resin material 4.

The absorptive resin material 5 and the transmissible resin material 4 may contain reinforcing fibers such as a glass fiber and a carbon fiber, whenever necessary.

As for the combination of the absorptive resin material 5 and the transmissible resin material 4, it is preferred to use those resins which have mutual compatibility to form a combination. A combination of different kinds of resins can be used besides a combination of resins of the same kind.

The kind of the laser beam L used as the heating source is appropriately selected in relation with the absorption spectrum of the transmissible resin material 4 transmitting the laser beam L so that the transmission factor of the transmissible resin material 4 exceeds a predetermined value. Examples of such a laser beam L include a YAG laser, a semiconductor laser, a glass-neodymium laser, a ruby laser, a helium-neon laser, a krypton laser, an argon laser, a hydrogen laser and a nitrogen laser.

Figure 6:
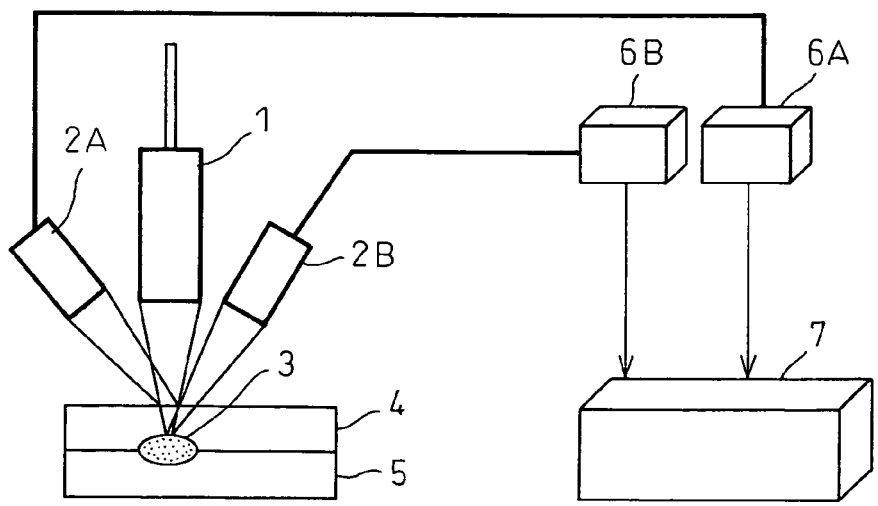
FIG. 6 is an explanatory view for explaining a construction of a laser deposition acceptance judgment apparatus according to a second embodiment of the invention.

FIG. 6 is an explanatory view for explaining a laser deposition acceptance judgment apparatus according to the second embodiment of the invention. In the first embodiment, the infrared beam sensor 2 monitors the exothermic quantity of the deposition portion 3. In this case, it is difficult to judge whether the increase of the exothermic quantity of the deposition portion 3 results from the increase of applied energy or from the increase of the gap when applied energy of the laser beam L from the laser head 1 changes, and the judgment is made on the premise that applied energy remains always constant.

The second embodiment can cope with the change even when applied energy changes. To this end, the second embodiment includes a first infrared beam sensor 2A (another detection means) for detecting the exothermic quantity of the transmissible resin material 4 and a second infrared beam sensor 2B for detecting the exothermic quantity of the deposition portion 2B. The first and second infrared beam sensors 2A and 2B use dedicated-sensor amplifiers 6A and 6B, respectively. The outputs detected by the infrared beam sensors 2A and 2B and converted to electric signals are amplified by the sensor amplifiers 6A and 6B, respectively and are then inputted to the judgment device 7. The rest of the construction is the same as that of the first embodiment and an explanation will be omitted.

Figure 7:
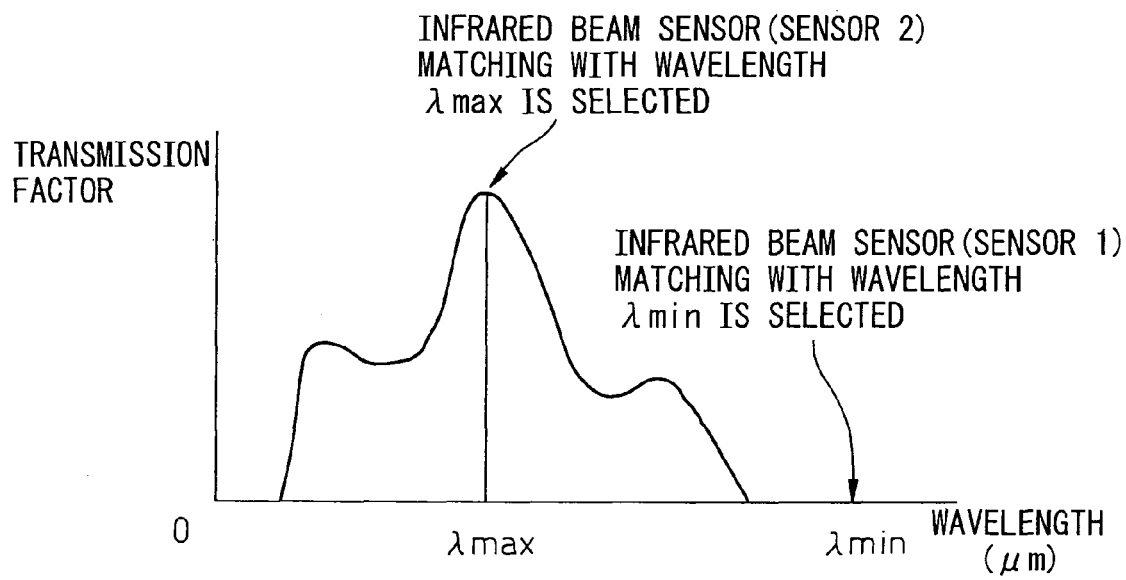
FIG. 7 is a graph showing transmission factor characteristics of a transmissible resin for an infrared beam as a selection condition of an infrared beam sensor.

FIG. 7 is a graph showing the transmission factor of the transmissible resin for the infrared beam. The abscissa represents the wavelength and the ordinate does the transmission factor. In the second embodiment, a sensor matching with a wavelength λmax (μm) of the infrared beam at which the transmission factor becomes maximal is used for the second infrared beam sensor 2B for detecting the exothermic quantity of the deposition portion 3 and a sensor matching with a wavelength λmin (μm) of the infrared beam at which the transmission factor becomes minimal is used for the first infrared beam sensor 2A for detecting the exothermic quantity of the transmissible resin material 4. The first infrared beam sensor 2A measures, as the measurement spot, the exothermic quantity of the surface portion of the transmissible resin material 4 into which the laser beam L is incident and the second infrared beam sensor 2B measures the exothermic quantity of the deposition portion 3 and is basically the same as that of the first embodiment.

Figure 8:
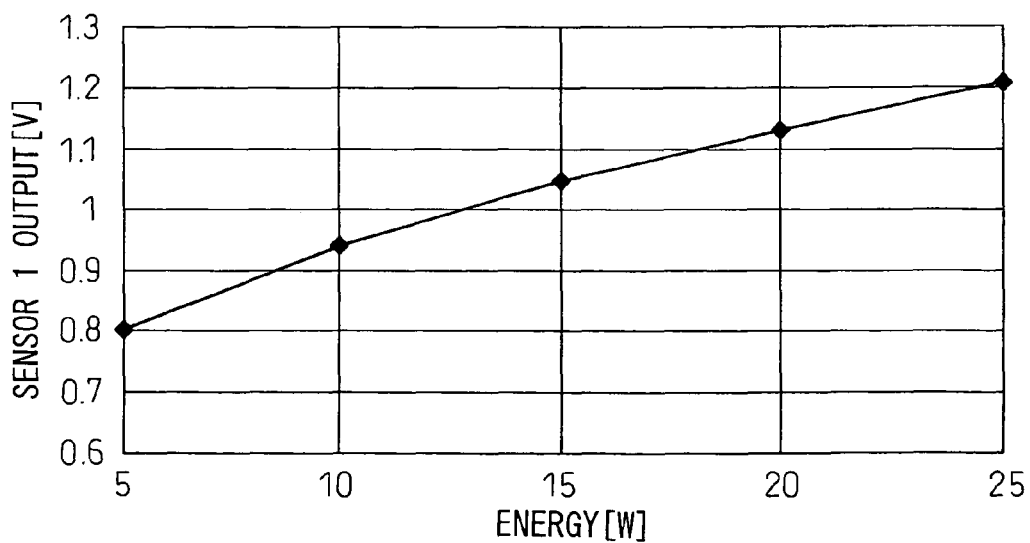
FIG. 8 is a graph showing the relation between applied energy and a first infrared sensor output.

FIG. 8 is a graph showing the relation between applied energy by the laser beam L and the output (V) of the first infrared beam sensor (sensor 1) 2A when the applied energy changes. In other words, the exothermic quantity of the transmissible resin material 4 increases substantially in proportion to the increase of applied energy (W).

Figure 9:
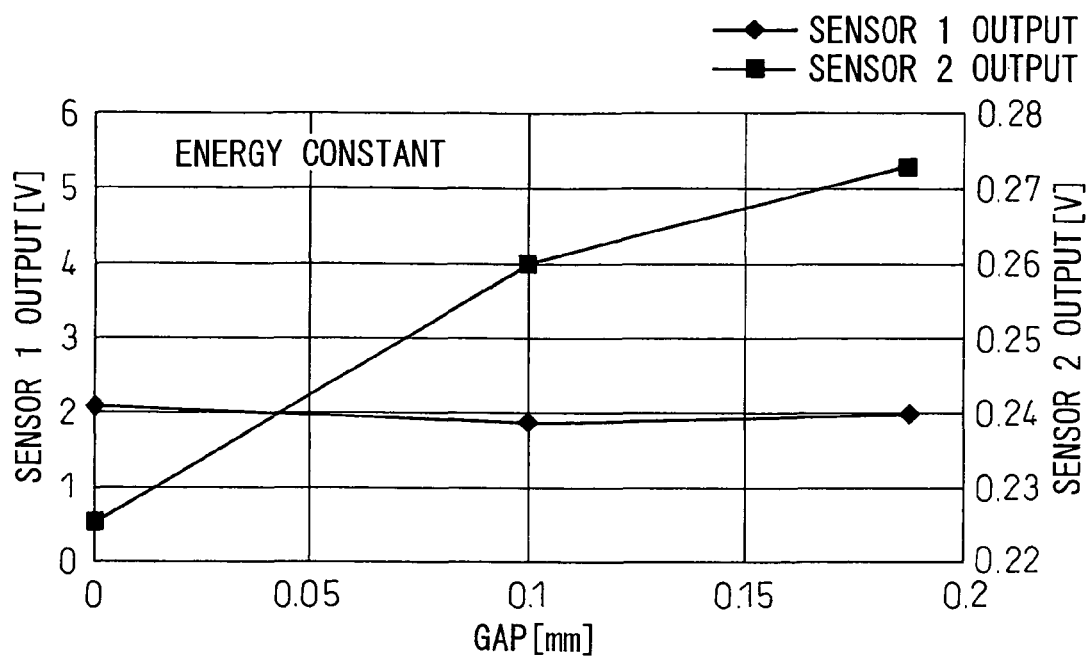
FIG. 9 is a graph showing the relation between a gap of both resin materials and first and second infrared beam sensor outputs when the applied energy is constant.

FIG. 9 is a graph showing the relation between the gap (mm) and the outputs (V) of the first and second infrared beam sensors (sensors 1 and 2) 2A and 2B when applied energy is constant. The abscissa represents the gap (mm) between both resin materials 4 and 5 and the ordinate does the outputs (V) of the first and second infrared sensors 2A and 2B. The output of the first infrared beam sensor 2A is plotted by black squares and the output of the second infrared beam sensor 2B, by black diamonds. As can be appreciated from this graph, the output of the second infrared beam sensor 2B increases with the increase of the gap between both resin materials 4 and 5 but the output of the first infrared beam sensor 2A remains substantially constant when applied energy is constant. In other words, when the applied energy is constant, the exothermic quantity of the deposition portion 3 increases with the increase of the gap but the exothermic quantity of the transmissible resin material 4 is constant but has no relation with the gap.

Figure 10:
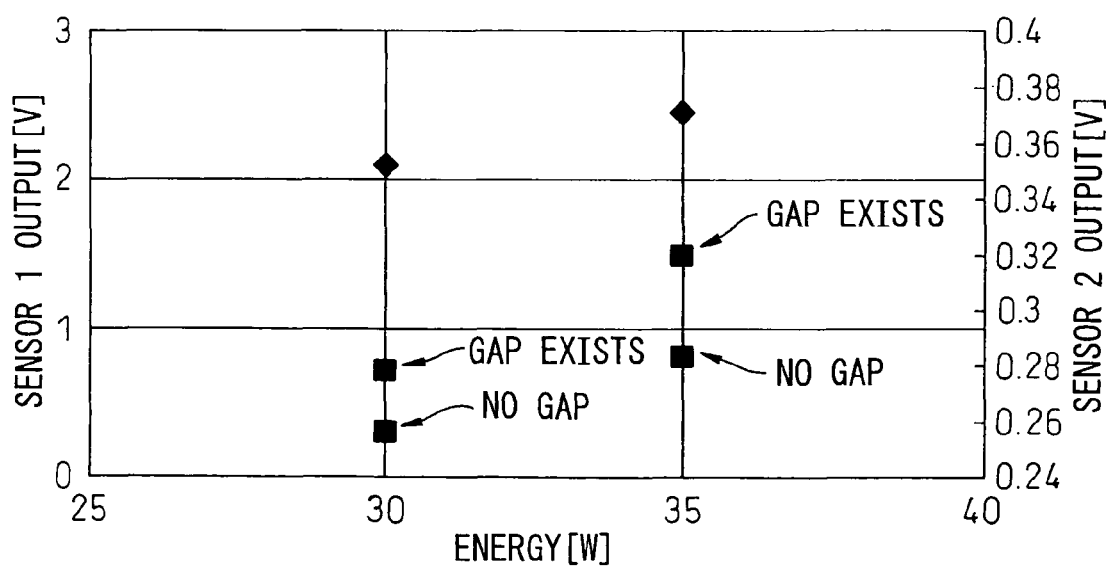
FIG. 10 is a flowchart showing the relation between applied energy and the first and second infrared beam sensor outputs in terms of the existence/absence of the gap.

FIG. 10 is a graph showing the relation between the gap (mm) and the outputs (V) of the first and second infrared beam sensors (sensors 1 and 2) 2A and 2B in terms of the absence/existence of the gap when the applied energy changes. The output of the first infrared beam sensor 2A is about 2.1 V when applied energy is 30 W, and the output of the second infrared beam sensor 2B is about 0.28 V when the gap exists and is about 0.26 V when the gap does not exist. The output of the first infrared beam sensor 2A is about 2.4 V when applied energy is 35 W and the output of the second infrared beam sensor 2B is about 0.32 V when the gap exists and is about 0.28 V when the gap does not exist. In this case, the output of the second infrared beam sensor 2B when the gap exists at applied energy of 30 W is substantially equal to the output when the gap does not exist at applied energy of 35 W.

Figure 11:
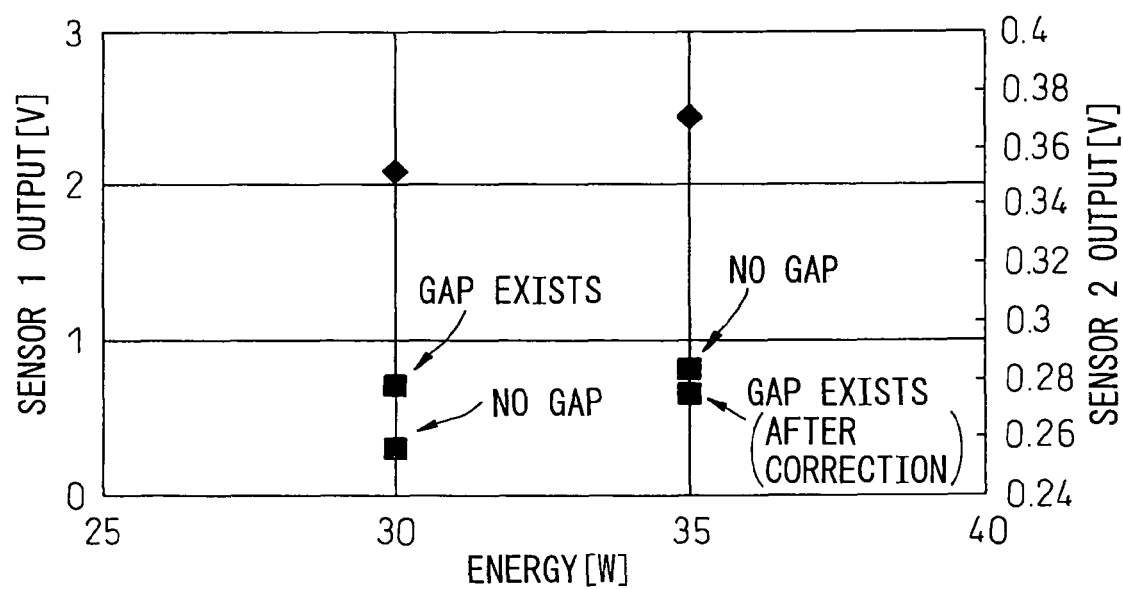
FIG. 11 is a graph for explaining a method that corrects the second infrared beam sensor output by an energy change quantity.

FIG. 11 shows a graph after the correction of the energy change component. In other words, when applied energy changes from 30 W to 35 W, the correction of the output of the second infrared beam sensor 2B is made dividedly for the case where the gap exists and for the case where it does not. The output of the second infrared beam sensor 2B after this correction is about 0.27 V. Correction of the second infrared beam sensor 2B is not made when no gap exists.

According to the second embodiment described above, the first infrared beam sensor 2A matching with the wavelength at which the transmission factor is low, and exothermy of the deposition portion 3 is not detected, is used to detect only the exothermic condition of the transmissible resin material 4. Next, the second infrared beam sensor 2B matching with the wavelength of the infrared beam having a high transmission factor is used to detect the exothermic condition of the deposition portion 3. In this way, it is possible to monitor whether or not the deposition portion 3 is formed by the application of suitable energy to the deposition portion 3 and whether or not the non-deposited portion is formed owing to the occurrence of the gap between both resin materials 4 and 5.

When the applied energy changes, exothermy of the transmissible resin material 4 changes as shown in FIG. 8. Therefore, the defect of the deposition portion 3 resulting from the energy change can be judged from the output result of the first infrared beam sensor 2A. Next, when deposition is made without a gap, exothermy of both transmissible resin material 4 and deposition portion 3 change substantially proportionally to the change of applied energy. In consequence, the outputs of both first and second infrared beam sensors 2A and 2B increase (change). When deposition is made in the presence of the gap, however, the change does not exist in the output of the first infrared beam sensor 2A and only the output of the second infrared beam sensor 2B increases as shown in FIG. 9 if applied energy is equal. Consequently, it is possible to judge that the gap exists between both resin materials 4 and 5 and that the deposition portion 3 is defective.

When deposition is made in the presence of the gap at a different applied energy, there is the case where the output of the second infrared beam sensor 2B in the state where applied energy is low and the gap exists and the output of the second infrared beam sensor 2B under the state where applied energy is high but the gap does not exist are at the same level. Because the output of the first infrared beam sensor 2A changes substantially proportionally to the change of applied energy, however, the change component of the second infrared beam sensor 2B is corrected for the output of this sensor 2B to cancel the output change component of the second infrared beam sensor 2B due to the change of applied energy as shown in FIG. 11 and the defect of the deposition portion 3 due to the existence of the gap can be judged from the level of the corrected output.

As described above, the second embodiment can monitor whether or not the change of applied energy exists during deposition, whether or not the gap exists between the resin materials 4 and 5 or whether or not the change of applied energy and the gap exist.

FIG. 12 is a flowchart for judging acceptance/rejection of the deposition portion 3 by the judgment device 7 according to the second embodiment. First, the exothermic quantity of the transmissible resin material 4 is measured from the output of the first infrared beam sensor 2A in Step S11. In the next Step S12, the exothermic quantity of the deposition portion 3 of the resin materials 4 and 5 is measured from the output of the second infrared beam sensor 2B in Step S12. Whether or not the exothermic quantity (output of first infrared beam sensor) of the transmissible resin material 4 measured by the first infrared beam sensor 2A is within the range of the upper and lower limits is judged in Step S13. When the result is out of this range (in the case of NO), the flow proceeds to Step S19 and applied energy due to the laser beam L is judged as being insufficient or excessive and the flowchart is completed as deposition defect.

When the exothermic quantity of the transmissible resin material 4 is judged as falling within the upper and lower limit range in Step S13 (in the case of YES), the flow proceeds to Step S14 and whether or not the exothermic quantity of the deposition portion 3 of both resin materials 4 and 5 measured by the second infrared beam sensor 2B is below the upper limit is judged. When the exothermic quantity is below the upper limit (in the case of YES), the flow proceeds to Step S15 and the deposition condition of the deposition portion 3 is judged as excellent. The flow is thus completed.

When the exothermic quantity of the deposition portion 3 is not judged as being below the upper limit in Step S14 (in the case of NO), the flow proceeds to Step S16 and whether or not the change of applied energy of the laser beam L exists is judged. When the energy change exists (in the case of YES), the flow proceeds to Step S18 and the change component of the output of the second infrared beam sensor 2B is corrected on the basis of the output change measured by the first infrared beam sensor 2A. After the output correction of the second infrared beam sensor 2B is made, the flow returns to the previous Step S14. When the energy change is not judged as existing (in the case of NO) in Step S16, the flow proceeds to Step S17. It is judged hereby that the excess of the exothermic quantity of the deposition portion 3 beyond the upper limit results from the existence of the gap between both resin materials 4 and 5, and the flowchart is completed by judging that the deposition portion 3 is inferior.

The second embodiment can monitor the deposition condition of the deposition portion 3 in this way even when a change of applied energy exists.

While the invention has been described by reference to specific embodiments chosen for purposes of illustration, it should be apparent that numerous modifications could be made thereto, by those skilled in the art, without departing from the basic concept and scope of the invention.

The invention claimed is:

1. A laser deposition acceptance judgment method comprising:

superposing a transmissible resin material having a transmission factor relative to a laser beam and an absorptive resin material having an absorption factor relative to the laser beam with one another so that the transmissible resin material is positioned on a laser irradiation side;

forming a deposition portion by thermally fusing a contact area between the transmissible resin material and the absorptive resin material through irradiating the transmissible resin material and the absorptive resin material with the laser beam;

detecting an exothermic quantity of the deposition portion emitted from the deposition portion by using a first infrared beam sensor during the forming of the deposition portion;

detecting an exothermic quantity of the surface of the transmissible resin material irradiated by the laser beam by using a second infrared beam sensor during the forming of the deposition portion; and judging a deposition condition of the deposition portion on the basis of the quantities detected by the first and second infrared beam sensors;

wherein the deposition portion is judged as acceptable when the output of the second infrared beam sensor falls within upper and lower limits and the output of the first infrared beam sensor is below an upper limit.

* * * * *